(12) United States Patent
Teuber

(10) Patent No.: US 6,669,011 B2
(45) Date of Patent: Dec. 30, 2003

(54) CONVEYING SYSTEM

(75) Inventor: Toralf Teuber, Neufahrn (DE)

(73) Assignee: Joh. Winklhofer & Sohne GmbH und Co. KG, Munich (DE)

(*) Notice: Subject to any disclaimer, the term of this patent is extended or adjusted under 35 U.S.C. 154(b) by 52 days.

(21) Appl. No.: 10/151,420

(22) Filed: May 17, 2002

(65) Prior Publication Data

US 2003/0010606 A1 Jan. 16, 2003

(30) Foreign Application Priority Data

May 17, 2001 (DE) .......................................... 101 24 131

(51) Int. Cl.⁷ .............................................. B65G 29/00
(52) U.S. Cl. ................................ 198/867.14; 198/803.2
(58) Field of Search ....................... 198/867.14, 867.15, 198/803.2

(56) References Cited

U.S. PATENT DOCUMENTS

| | | | |
|---|---|---|---|
| 3,837,289 A | | 9/1974 | Marshman et al. |
| 4,388,990 A | | 6/1983 | Radice et al. |
| 4,953,691 A | * | 9/1990 | Janzen .................. 198/803.01 |
| 5,249,665 A | * | 10/1993 | Silzer et al. ........... 198/803.01 |
| 5,341,620 A | | 8/1994 | Katou et al. |
| 5,601,182 A | * | 2/1997 | Tidland ...................... 198/692 |
| 5,730,280 A | | 3/1998 | Dalferth |
| 5,779,583 A | * | 7/1998 | Nakatani et al. ............. 474/145 |
| 5,785,166 A | | 7/1998 | Hoefling et al. |
| 5,857,558 A | * | 1/1999 | Irvine ..................... 198/803.2 |
| 5,873,452 A | * | 2/1999 | Nolan ...................... 198/465.3 |
| 6,170,650 B1 | * | 1/2001 | Morikiyo et al. ......... 198/867.14 |
| 6,209,708 B1 | * | 4/2001 | Philipp et al. ............. 198/465.1 |
| 6,318,546 B2 | * | 11/2001 | Koegler ................. 198/867.14 |
| 6,321,904 B1 | * | 11/2001 | Mitchell ................ 198/867.11 |
| 6,568,525 B2 | * | 5/2003 | Stone et al. ............. 198/803.2 |

FOREIGN PATENT DOCUMENTS

| | | |
|---|---|---|
| DE | 1100554 | 2/1961 |
| DE | 1194325 | 6/1965 |
| DE | 51589 | 11/1966 |
| DE | 2488249 | 4/1977 |
| DE | 2814956 A1 | 11/1978 |
| DE | 8619069 | 10/1986 |
| DE | 4236784 A1 | 5/1993 |
| DE | 9305702 U1 | 9/1993 |
| DE | 4216372 A1 | 10/1993 |
| DE | 29716178 U1 | 1/1998 |
| DE | 4334064 C3 | 7/1999 |
| EP | 0 767114 A1 | 4/1997 |
| WO | WO 97/20760 | 6/1997 |
| WO | WO 98/25840 | 6/1998 |

* cited by examiner

Primary Examiner—Christopher P. Ellis
Assistant Examiner—Rashmi Sharma
(74) Attorney, Agent, or Firm—Marshall, Gerstein & Borun LLP

(57) ABSTRACT

A conveying system comprising a drive chain and at least one conveying carrier, the conveying system being flexible for the most different goods to be conveyed. The conveying carrier can be brought into detachable engagement with the drive chain, the drive chain comprising chain links arranged in a row and interconnected via a chain joint, a chain joint being formed by a sleeve pertaining to a first chain link and by a bolt passed through the sleeve and pertaining to a second chain link, at least part of the bolts projecting laterally at both sides and a transporting sleeve being arranged on each of the projecting end portions, and the conveying carrier comprising an engaging means which can be brought into detachable engagement at least with both transporting sleeves of a bolt. The invention further relates to a drive chain for such a conveying system.

12 Claims, 2 Drawing Sheets

CONVEYING SYSTEM

FIELD OF THE INVENTION

The present invention relates to a conveying system comprising a drive chain and at least one conveying carrier.

BACKGROUND OF THE INVENTION

The prior art discloses a number of conveying systems using a chain. As a rule, conveying means or carriers are fixedly mounted on the chain for carrying along the goods to be conveyed at least over a predetermined path. In most cases the goods are conveyed via transporting pins projecting at one side and having put thereover the goods which are normally in the form of hollow bodies. These systems have often the drawback that the chains must have a corresponding width for their conveying function.

SUMMARY OF THE INVENTION

It is thus the object of the present invention to provide a conveying system which can be used for conveying goods of the most different types.

To this end a conveying system is provided comprising a drive chain and at least one conveying carrier, the conveying chain comprising chain links which are arranged in a row and interconnected by a chain joint, a chain joint being formed by a sleeve pertaining to a first chain link and by a bolt passed through the sleeve and pertaining to a second chain link, the bolt projecting laterally at both sides and a transporting sleeve being arranged on each of the projecting end portions and the conveying carrier comprising an engaging means which can be brought into detachable engagement at least with both transporting sleeves of a bolt.

According to this design the conveying carrier itself thus comprises engaging means for the detachable engagement with transporting sleeves of a drive chain. A standard commercial chain may here be used that is equipped accordingly with bolts laterally projecting at both sides and with transporting sleeves arranged thereon. The use of such transporting sleeves makes it possible to protect the bolts from wear caused by engagement with the conveying carrier. The desired engagement characteristics can be obtained by selecting the most different materials. Moreover, the drive chain may be of a relatively small construction. Only the forces required for engagement with the engaging means must be transmitted. The conveying carriers can be adapted individually to the goods to be conveyed. That is why the conveying system is very flexible because the conveying track once provided by the drive chain can be used for the most different conveying goods. Suitable conveying carriers can be adapted to all imaginable conveying goods. Another advantage is that the drive chain could also be constructed in symmetry by the transporting sleeves arranged at both sides. The fact that two engagement points or portions are provided in spaced apart relationship for the engaging means on a bolt owing to the two transporting sleeves arranged thereon reduces wear and ensures a more stable and also less vibration-prone conveying function. In particular in the case of relatively large acceleration and deceleration operations this is of enormous advantage because a reliable engagement of the drive chain with the conveying carrier is ensured.

Advantageously, the transporting sleeves can be pressed onto the end portions of the bolts. Since there is no relative movement between bolt and transporting sleeve, all of the parameters to be provided for the wear characteristics with respect to the engagement with the conveying carrier must be satisfied by the transporting sleeve itself, so that an optimum adaptation can be chosen. Moreover, since the transporting sleeve is pressed onto the end portions of the bolts, the bolt need not be riveted so that other components, e.g. plates in the case of a possibly used plate chain, are secured. A riveting operation for deforming the end portions of the bolt is not needed. This function can be provided in an optimum way by suitably choosing the press fit between bolt and transporting sleeve.

Tests have shown that excellent transporting characteristics will be obtained according to one variant if a plastic material is used as the material for the transporting sleeve. Preferably, a polyamide (e.g. polyamide 12; lauramide or a polyacetal (ertacetal) can here be used. Apart from a noise reduction during the mostly sudden engagement between transporting sleeve and engaging means, suitable plastics also provide the necessary wear characteristics.

Preferably, the conveying carrier can comprise a toothing as the engaging means. Such a toothing may be in the manner of the toothing of a chain gear so that standard dimensions can be used in the chains.

In one embodiment, the conveying carrier is designed as a container and the toothing is molded onto the bottom side of the container. This has the advantage that a container can be used for an almost infinite number of different conveying goods and a corresponding receiving volume need only be provided with respect to the outer dimensions. For instance, standardized containers can here be used that are equipped with corresponding engaging means (toothing). Such a system would e.g. be excellently suited for a shelf system for a warehouse in which containers equipped with different goods must be transported to specific places, so that the containers are only in temporary engagement with the drive chain all the time.

Depending on the design of the engaging means it may entirely suffice when only every second bolt of the drive chain is provided with a transporting sleeve. Large gaps are thereby created between the transporting sleeves, the gaps permitting also a more stable design of the engaging means. In particular a toothing with broader or longer and thus more stable teeth could be designed.

Moreover, the drive chain can comprise alternating inner chain links and outer chain links, each inner chain link comprising two parallel sleeves and two parallel inner plates connecting the sleeves and each outer chain link comprising two parallel bolts and two parallel outer plates connecting the bolts, at least some bolts comprising end portions laterally projecting beyond the outer plates and having transporting sleeves arranged thereon. Consequently, use is made of a well known drive chain of a standard constructional type that comprises longer bolts with transporting sleeves only sporadically or exclusively. Such a drive chain is excellently suited for driving operations via a chain gear engaging into the gaps between the sleeves. Hence, the engagement of the engaging means of the conveying carrier is thus entirely decoupled from the engagement of a driving or deflecting chain gear.

To reduce wear by driving or deflecting chain gears, running sleeves may additionally be arranged in coaxial fashion on the sleeves.

BRIEF DESCRIPTION OF THE DRAWINGS

Furthermore, the invention relates to a drive chain for a conveying system. The conveying system is characterized in that there are provided end portions projecting at both sides and pertaining to at least one bolt of a chain link, and that a transporting sleeve is mounted on each projecting end portion, the transporting sleeve being designed for engagement into an engaging means of a conveying carrier of the conveying system.

An embodiment of the present invention will now be explained in more detail with reference to a drawing, in which.

DETAILED DESCRIPTION OF THE INVENTION

Figure 1:
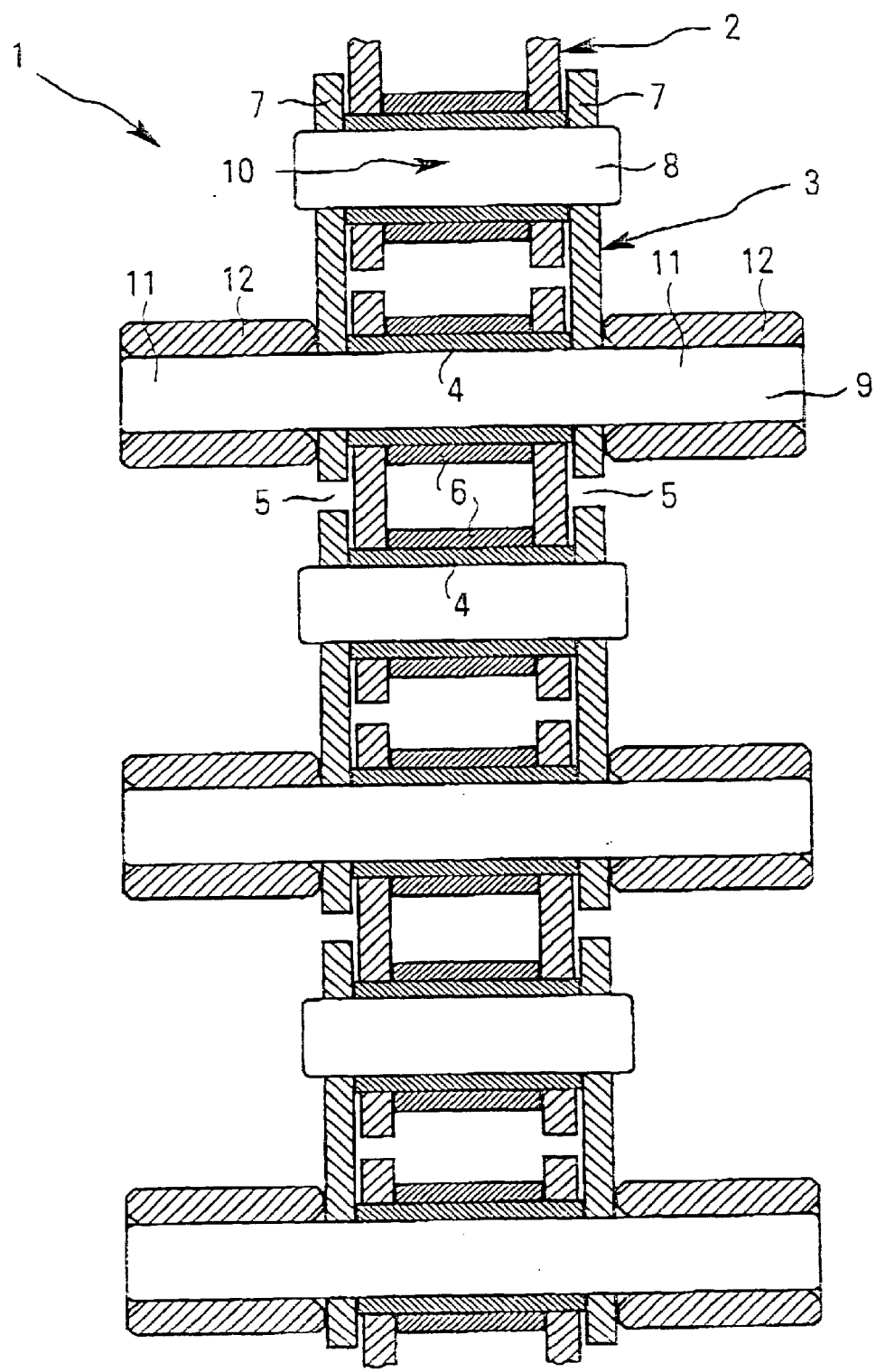
FIG. 1 is a sectional top view showing a drive chain for a conveying system.

The drive chain 1 shown in FIG. 1 comprises inner chain links 2 and outer chain links 3 which are alternatingly arranged in series one after the other.

The inner chain link 2 comprises two sleeves 4 arranged in parallel with each other, each being pressed into an opening of two inner plates 5 arranged in parallel with each other. The outer circumference of the sleeves 4 has positioned thereon a running sleeve or running roller 6 which is coaxially arranged in rotatable fashion on the sleeve 4.

The outer chain link 3 comprises two outer plates 7 that are arranged in parallel with each other and connected by two bolts 8 and 9 pressed into openings of the outer plates 7. The interior distance of the outer plates 7 is greater than the length of the sleeves 4 or the outer distance of the inner plates 5. A bolt 8 and a bolt 9 of the outer chain link 3 jointly form a chain joint 10 together with a sleeve 4 of the inner chain link 2. To this end the bolts 8 and 9 are each received in the sleeve so as to be rotatable about their axis.

Each outer chain link 3 comprises a short bolt 8 and a long bolt 9. Hence, long and short bolts 8 and 9 are alternating. While the short bolt 8 according to a standard plate chain only projects to a small degree and, as a rule, is slightly deformed at the end to secure the outer plates additionally for a press fit, the bolt 9 comprises considerably projecting end portions 11 at each side. A hollow-cylindrical transporting sleeve 12 is pressed onto each of the end portions 11. The transporting sleeve 121 consists preferably of polyamide or a similar suitable plastic material. A material which is known under the name "ertacetal" may e.g. be used. The overdimension used for the press fit is about 0.2 to 0.3 mm. Part of said considerable overlap is noticed by an increase in the outer diameter after pressing onto the bolt. However, it is also possible to use standard sleeves whose overlap is about 0.02 to 0.07 mm. However, it would also be possible to use sintered materials with optionally integrated self-lubrication for the transporting sleeves 12. Transporting sleeves 12 produced by the MIM technique can also be used.

In addition to the transporting function of the transporting sleeves 12, these take over the function of securing the outer plate 7 due to their press fit with the end portions 11 of the bolts 9. An additional riveting of the bolt 9 is not needed. In a maintenance-free configuration the bolt 9 consists of hardened steel with a coating (nickel-plated) or a wear-optimized chemothermal coating (boronized). The sleeve 12 will then consist of a sintered material impregnated with a lubricant.

Figure 2:
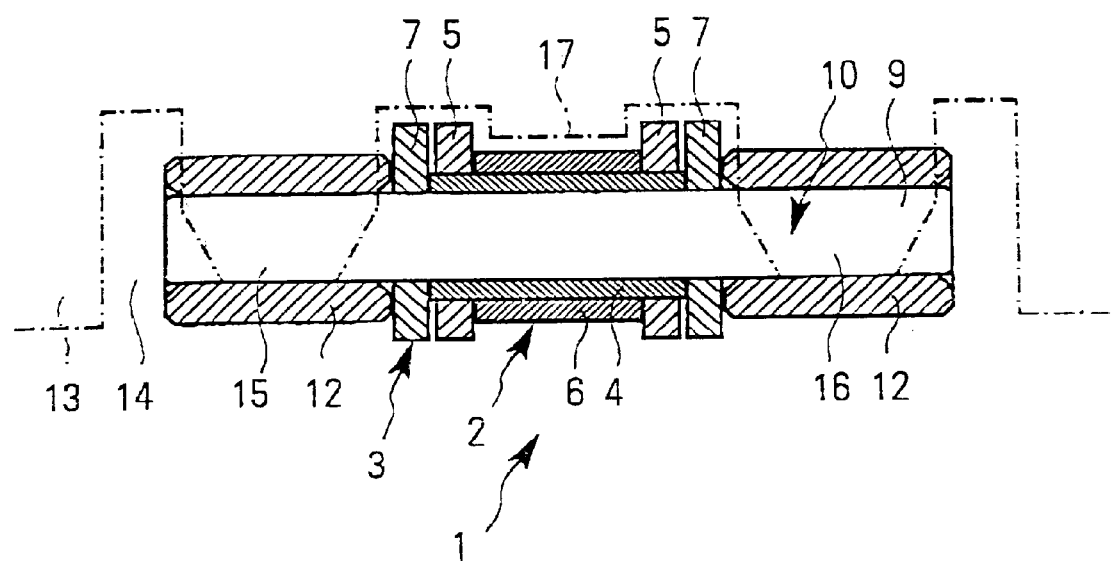
FIG. 2 is a sectional front view showing the chain of FIG. 1 with a schematically drawn conveying container.

It is now schematically shown with reference to FIG. 2 how the drive chain of FIG. 1 cooperates with a schematically illustrated conveying carrier 13. In the present case the conveying carrier 13 shall be represented by a transportation container or conveying container. It is also possible that two drive chain tracks are arranged in parallel spaced-apart relationship and jointly move a large container. The schematically illustrated container body comprises a groove 14 the base of which is provided with a contour comprising two parallel-arranged rack sections 15 and 16, as well as a central portion 17 adapted to the outer contour of the plates 5 and 7 and the running sleeve 6. Consequently, only the transporting sleeves 12 get into contact with the individual teeth of the rack portions 15 and 16. The depth of the groove 14 can be chosen such that the drive chain 1 disappears in said groove substantially entirely or only projects to a slight degree beyond said groove. At least the depth can be chosen such that the transporting sleeves 12 are fully received therein.

With suitable measures, such as ramp sections for guiding the chain or for supplying the conveying carrier 13, an engaging contact can be established with a continuously driven drive chain 1. In most cases, however, the drive chain 1 is stopped for engagement with the conveying carrier 13, the conveying carrier 13 being fully mounted on the drive chain 1 and acceleration and transportation to the intended place being subsequently performed. At said place the drive chain 1 can be stopped again and the conveying carrier 13 can be lifted from the drive chain 1.

The individual teeth of the rack portions 15 and 16 can be designed in accordance with a rack having the tooth profile of a chain gear. When the drive chain 1 shown in FIG. 1 is used, the tooth sections can be made sufficiently long because only every second bolt is equipped with transporting sleeves 12.

The most different conveying articles can be moved by using conveying carriers 13 which can be adapted individually to the conveying conditions, in particular when a conveying container is used. The present conveying system is thus very independent of the articles to be respectively moved and therefore excellently suited for shelf systems and similar transportation systems in which considerable amounts of conveying material must be handled because of complicated conveying logistics.

I claim:

1. A conveying system comprising a drive chain (1) and at least one conveying carrier (13) which can be brought into detachable engagement with said drive chain (1), said drive chain (1) comprising chain links (2, 3) which are arranged in a row and interconnected via chain joints (10), at least one said chain joint (10) being formed by a sleeve (5) pertaining to a first chain link (2) and by a bolt (8, 9) passed through said sleeve (5) and pertaining to a second chain link (3), at least some of said bolts (9) projecting laterally at both sides and a transporting sleeve (12) being arranged on each of the projecting end portions (11) and said conveying carrier (13) comprising an engaging means (15, 16) which can be brought into detachable engagement at least with both said transporting sleeves (12) said some bolts (9).

2. The conveying system according to claim 1, wherein said transporting sleeves (12) are pressed onto said end portions (11) of said spine bolts (9).

3. The conveying system according to claim 1, wherein said transporting sleeves (12) are made from a plastic material.

4. The conveying system according to claim 1, wherein said conveying carrier (13) comprises a toothing as an engaging means (15, 16).

5. The conveying system according to claim 4, wherein said toothing is designed in the form of two parallel rack sections (15, 16).

6. The conveying system according to claim 4, wherein said conveying carrier (13) is made from a plastic material and said toothing is made integral therewith.

7. The conveying system according to claim 6, wherein said conveying carrier (13) is designed as a container and said toothing (15, 16) is molded onto the lower side of said container.

8. The conveying system according to claim 1, wherein only every second bolt (9) of said drive chain (1) is provided with a transporting sleeve (12).

9. The conveying system according to claim 1 wherein said drive chain (1) comprises alternating inner chain links (2) and outer chain links (3), each said inner chain link (2) comprises two parallel sleeves (4) and two parallel inner plates (5) connecting said parallel sleeves (4), and each outer chain link (3) comprises two parallel bolts (8, 9) and two parallel outer plates (7) connecting said bolts (8, 9), at least some of said bolts (9) comprising end portions (11) projecting laterally beyond said outer plates (7) and including said transporting sleeves (12) arranged thereon.

10. The conveying system according to claim 9, and running sleeves (6) are coaxially arranged on said parallel sleeves (4).

11. A drive chain for a conveying system, comprising chain links (2, 3) arranged in a row and interconnected via chain joints (10), each chain joint (10) formed by a sleeve (5) pertaining to a first chain link (2) and by a bolt (8, 9) passed through said sleeve (5) and pertaining to a second chain link (3), bolt end portions (11) are provided that project at both sides and pertain to at least one bolt (9) of a chain link, and a transporting sleeve (12) is provided on each projecting bolt end portion (11), said transporting sleeve (12) being designed for engagement into an engaging means (15, 16) of a conveying carrier (13) of a conveying system.

12. The conveying system according to claim 3, and wherein said plastic material comprises one of polyamide and polyacetal.

* * * * *

UNITED STATES PATENT AND TRADEMARK OFFICE
CERTIFICATE OF CORRECTION

PATENT NO. : 6,669,011 B2
DATED : December 30, 2003
INVENTOR(S) : Toralf Teuber

It is certified that error appears in the above-identified patent and that said Letters Patent is hereby corrected as shown below:

Title page,
Item [73], Assignee, please delete "Sohne" and replace with -- Söhne --.

Column 4,
Line 55, please delete "said some bolts" and replace with -- of said some bolts --.
Line 58, please delete "spine" and replace with -- some --.

Signed and Sealed this

First Day of March, 2005

JON W. DUDAS
*Director of the United States Patent and Trademark Office*